United States Patent [19]

Mocker

[11] 3,968,362
[45] July 6, 1976

[54] OPTICAL SYSTEM FOR LASER DOPPLER HOMODYNE DETECTION

[75] Inventor: Hans W. Mocker, Minneapolis, Minn.

[73] Assignee: Honeywell Inc., Minneapolis, Minn.

[22] Filed: Aug. 11, 1975

[21] Appl. No.: 603,569

[52] U.S. Cl. ................................ 250/216; 350/55; 356/5
[51] Int. Cl.² .......................................... H01J 3/14
[58] Field of Search ...................... 356/4, 5, 28, 29; 250/216, 234, 235, 236; 350/48, 55, 50, 109, 294; 178/7.6

[56] References Cited
UNITED STATES PATENTS

| 3,410,641 | 11/1968 | Bergman | 356/5 |
|---|---|---|---|
| 3,781,552 | 12/1973 | Kadrmas | 250/216 |
| 3,802,775 | 4/1974 | Hughes | 356/4 |

Primary Examiner—David C. Nelms
Attorney, Agent, or Firm—David R. Fairbairn

[57] ABSTRACT

A laser Doppler homodyne detection system includes transmitting-receiver optics including a roof reflector and a twin off-axis Cassegrain reflector system.

38 Claims, 3 Drawing Figures

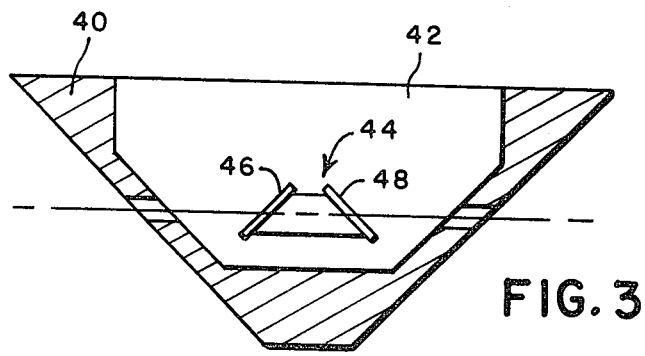

OPTICAL SYSTEM FOR LASER DOPPLER HOMODYNE DETECTION

BACKGROUND OF THE INVENTION

With the development of laser sources with good frequency stability, optical systems for Doppler homodyne detection have become possible. Laser Doppler systems are especially useful for flow measurement, true air speed measurement, vortex detection, moving target indication, and remote atmospheric measurements.

In a typical laser Doppler homodyne system, the laser beam is expanded in diameter and is directed at a target. The radiation back reflected and scattered by the target is received by receiver optics and directed to a detector. A portion of the laser beam is split off prior to transmission and forms the local oscillator beam. This local oscillator beam is also directed to the detector to produce Doppler homodyne signal.

One form of laser Doppler system is shown in R. Munoz et al., *Applied Optics*, 13, 2890 (Dec, 1974). This type of system is termed a "co-linear off-axis system". In this system, the laser beam is split by a beam splitter into the output and local oscillator beams. The output beam is directed to an off-axis Cassegrain telescope which provides beam expansion. The returning beam is reduced by the same Cassegrain telescope and is directed to a detector. The local oscillator beam is combined with the returning beam by means of a beam splitter.

An important disadvantage of the co-linear transmitter-receiver system is the inherent 6 db signal loss. This signal loss is due to the 50% beam splitter which is shared by the output and returning beams.

On-axis systems (systems in which the beam expander optics are located on-axis rather than off-axis) have additional disadvantages. These on-axis systems, which typically use a Cassegrain telescope, can reflect a large amount of laser energy under variable phase and frequency back into the laser and thus broaden the frequency spectrum of the laser. The performance of the system, therefore, is degraded.

One system which overcomes the 6 db signal loss problem uses a plane mirror having a hole through it. Both sides of the plane mirror are reflecting surfaces. The laser beam is expanded by beam expanding optics and the expanded beam is directed to the plane mirror, which is oriented at 45° to the direction of propagation of the expanded beam. Most of the beam is reflected by the first surface of the mirror and is directed to a cube corner reflector. The cube corner reflector reflects the beam to the target. A small portion of the beam, however, passes through the hole to become the local oscillator beam. The returning beam from the target is reflected off the second surface of the mirror and is directed along a common path with the local oscillator beam. The returning beam and the local oscillator beam pass through beam reducing lenses which focus the returning beam and the local oscillator beam on to the detector.

The disadvantages of this system are that it requires on-axis beam expanding optics. The on-axis arrangement results in back reflection which can degrade laser performance. In addition, the system uses several lenses to expand the output beam and to reduce the returning beam. When an infrared laser such as a $CO_2$ laser is used, these lenses can be very expensive.

SUMMARY OF THE INVENTION

The optical system of the present invention overcomes many of the problems associated with prior art laser Doppler homodyne detection systems. The optical system of the present invention includes light source means, roof reflector means, transmitter means, receiver means, and detector means.

The light source means produces a light beam. A first reflecting surface of the roof reflector means separates the light beam into first and second portions. The transmitter means receives the first portion from the first reflecting surface, expands the beam diameter of the first portion, and transmits the expanded first portion. The receiver means receives incident radiation and directs the incident radiation to a second reflecting surface of the roof reflector means. The detector means receives the incident radiation from the second reflecting surface and receives the second portion of the light beam. Detector means produces a signal which is indicative of the second portion of the light beam and the incident radiation.

A BRIEF DESCRIPTION OF THE DRAWINGS

FIG. 3 shows a roof reflector in combination with an attenuator which may be used in conjunction with the optical system of the present invention.

DETAILED DESCRIPTION OF THE PREFERRED EMBODIMENTS

Figure 1:
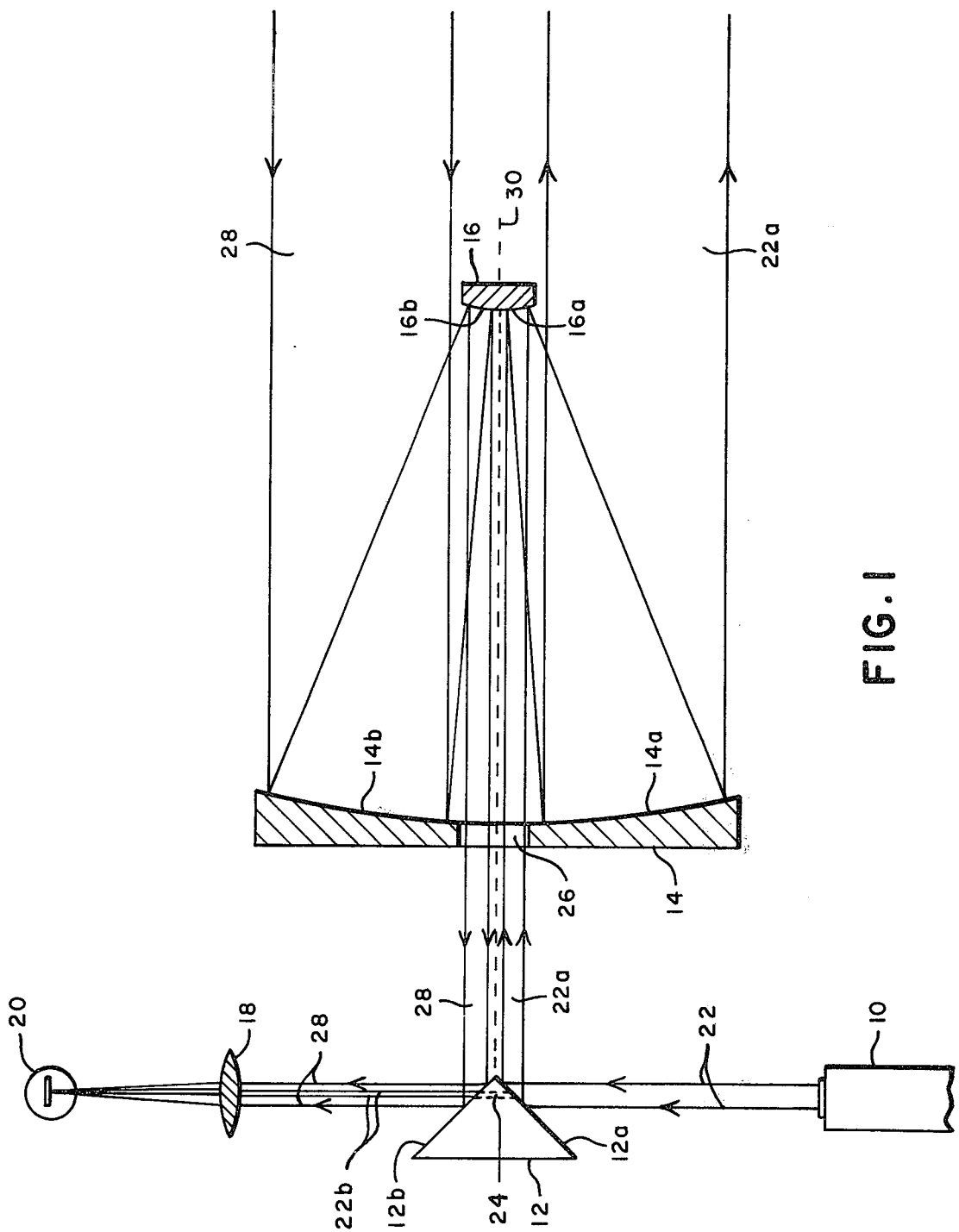
FIG. 1 shows one preferred embodiment of the optical system of the present invention.

FIG. 1 shows a partial cross-sectional view of the laser Doppler homodyne optical system of the present invention. This system includes a laser 10, a 90° roof reflector 12 having first and second reflecting surfaces 12a and 12b, a twin off-axis Cassegrain reflector system formed by primary reflector 14 and secondary reflector 16, lens 18, and detector 20.

Laser 10, which may be, for example, a carbon dioxide laser, produces a laser beam 22. Beam 22 is directed to first reflecting surface 12a of roof reflector 12. A first portion 22a of beam 22 is reflected by first reflecting surface 12a to form the output beam of the system. A small second portion 22b of beam 22 passes through hole 24 in roof reflector 12. Second portion 22b forms the local oscillator beam required for homodyne detection.

Output beam 22a passes through opening 26 in primary mirror 14. Output beam 22a then is reflected by third reflecting surface 16a of secondary reflector 16. Third reflecting surface 16a preferably is a spherical reflecting surface which diverges beam 22a.

Fourth reflecting surface 14a of reflector 14 receives the diverging output beam 22a from third reflecting surface 16a. Fourth reflecting surface 14a is preferably a parabolic surface and is positioned with respect to third reflecting surface 16a so that output beam 22a is collimated. The collimated output beam 22a is directed to the target, in some cases by a scanning mirror (not shown).

Incident radiation 28 (which is primarily the returning beam which has been back reflected and scattered by the target) is received by the receiver optics formed by fifth reflecting surface 14b of reflector 14 and sixth reflecting surface 16b of reflector 16. Fifth reflecting surface 14b is preferably a parabolic surface which is a common surface with fourth reflecting surface 14a. Sixth reflecting surface 16b is preferably spherical and forms part of a common surface with third reflecting surface 16a. Incident radiation 28 is converged and reflected by fifth reflecting surface 14b to sixth reflecting surface 16b. Incident radiation 28 is then collimated by sixth reflecting surface 16b and is directed to second reflecting surface 12b of roof reflector 12.

Second reflecting surface 12b reflects incident radiation 28 and directs it along an essentially common path with local oscillator beam 22b. Local oscillator beam 22b and incident radiation 28 are focused by lens 18 onto detector 20. The interference of the two beams at detector 20 produces a Doppler homodyne signal which is detected by detector 20.

The optical system of the present invention has several advantages. First, there is no 6 db loss in a system as there is in co-linear optical systems. This system does not use 50% beam splitters to separate the output and local oscillator beams nor does it use a 50% beam splitter to recombine the incident radiation with the local oscillator. The separation of the beam into output and local oscillator beams and the recombining of the incident radiation with the local oscillator beam is performed by roof reflector 12.

Second, the transmitter and receiver optics contain no on-axis surfaces that can back-reflect laser energy under variable phase and frequency into the laser and deteriorate laser frequency stability. The axis of the transmitter-receiver system is represented by dashed line 30 in FIG. 1. It can be seen that the beam expanding of output beam 22 and the beam reducing of incident radiation 28 is "off-axis".

Third, the present invention minimizes the use of transmitting optics. Only lens 18 is a transmitting optical device. All other components (roof reflector 12, primary reflector 14, and secondary reflector 16) are reflecting optical components. This leads to lower cost, since transmitting (refracting) optical components are considerably more expensive than reflecting optical components.

Fourth, the system uses a minimum of optical components. The beam separation, beam combining, transmitting, expanding, reducing, and receiving functions are all performed by three reflectors: roof reflector 12, primary reflector 14, and secondary reflector 16.

Fifth, although the system is a twin off-axis system, transmitter and receiver reflectors 14a and 14b may be formed on a common mirror substrate. Similarly, transmitter and reflector surfaces 16a and 16b may be formed on a common mirror substrate. This results in greater precision and ruggedness of the system.

Sixth, the system of the present invention provides the same beam spread (and thus spot size) for output beam 22a and incident radiation 28.

Seventh, the use of the twin off-axis Cassegrain reflector system in conjunction with the roof reflector 12 allows output beam 22a and incident radiation 28 to be parallel beams.

Figure 2:
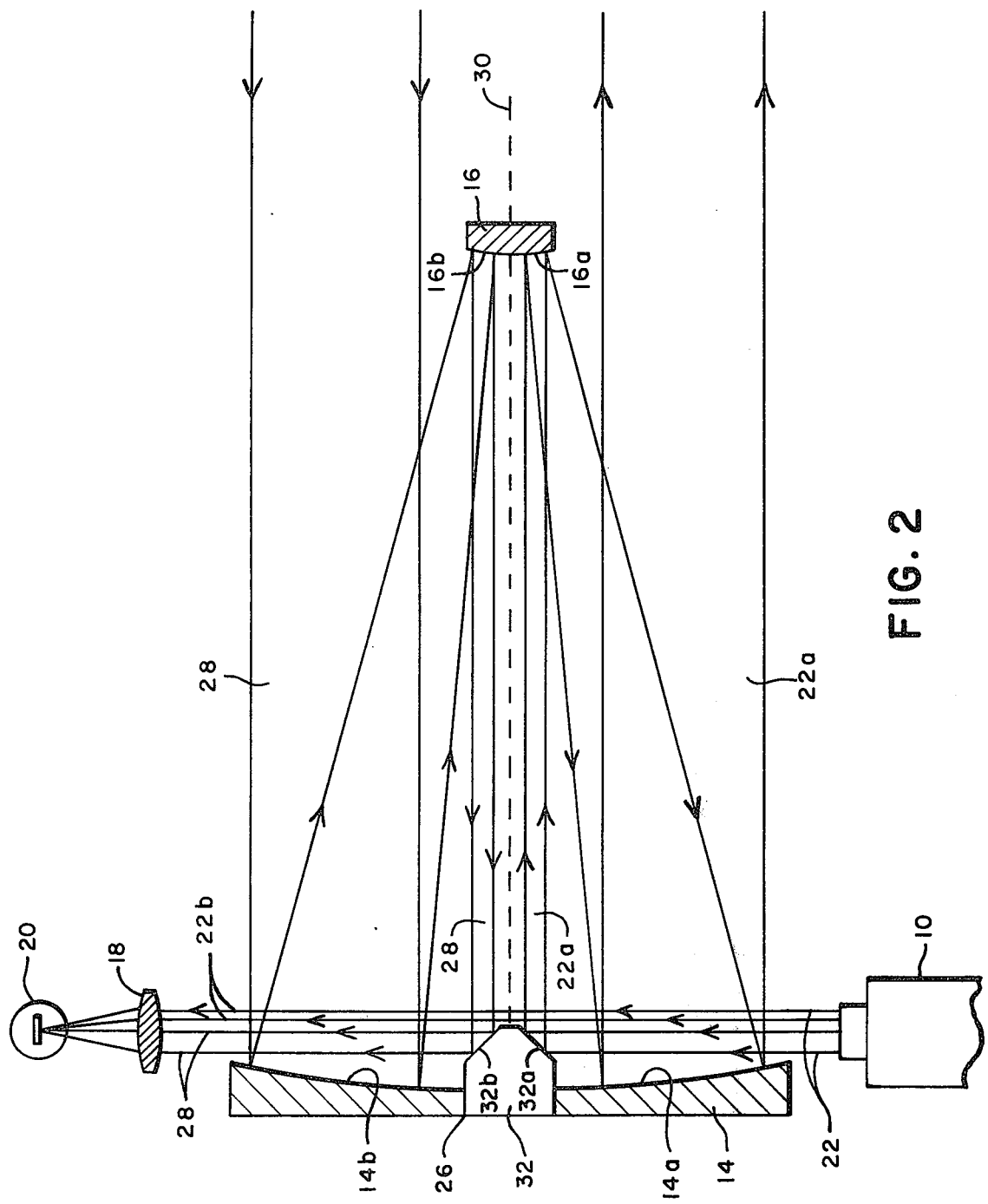
FIG. 2 shows another preferred embodiment of the present invention.

FIG. 2 shows another preferred embodiment of the present invention. The optical elements used in FIG. 2 are generally similar to those shown in FIG. 1, and similar numerals and letters have been used to designate similar elements.

The system of FIG. 2 has even greater ruggedness than the system of FIG. 1. Roof reflector 32 is mounted in opening 26 of primary reflector 14.

Beam 22 from laser 10 is directed to roof reflector 32. The major portion 22a of beam 22 is diverted to spherical secondary mirror 16 by first reflecting surface 32a. Output beam 22a strikes third reflecting surface 16a, which is the lower half of secondary mirror 16. Beam 22a is reflected and diverged to illuminate fourth reflecting surface 14a, which is the lower half of parabolic primary mirror 14. The spacing of secondary mirror 16 and primary mirror 14 are such that output beam 22a is collimated.

Incident radiation 28, which is primarily back reflected and scattered energy from the target, strikes fifth reflecting surface 14b, which is the upper half of primary mirror 14. Incident radiation 28 is converged and reflected by fifth reflecting surface 14b to sixth reflecting surface 16b. Sixth reflecting surface 16b, which is the upper half of secondary mirror 16, reflects and collimates incident radiation 28 and directs it to second reflecting surface 32b of roof reflector 32. Incident radiation 28 is reflected by second reflecting surface 32b, passes through lens 18, and is focused on detector 20.

Local oscillator beam 22b is provided by allowing a small spillover of beam 22 as it strikes roof reflector 32. This spillover is collected by lens 18 and is focused on to detector 20 to provide the necessary local oscillator power for homodyne operation. The amount of local oscillator power, which is typically about one to two milliwatts, may be adjusted by adjusting the position of roof reflector 32 along axis 30 to increase or decrease the amount of spillover.

In one preferred embodiment of the present invention, the desired output beam diameter for output beam 22a is about 0.6 centimeters. The ratio of the primary mirror focal length to the secondary mirror focal length gives the expansion effect of the optical system. In this preferred embodiment, therefore, a 10X expansion ratio is required. Thus, the laser output beam divergence of typically $3 \times 10^{-3}$ radians is reduced by a factor of 10 to $3 \times 10^{-4}$ radians.

Polishing of the parabolic primary mirror 14 is carried out on a quartz blank of 13 cm. diameter. After the mirror is properly figured, a hole 26 is drilled at the center, and the unused areas of the sides are removed. The finished mirror surface of 14, therefore, is only as wide as the required 6 centimeter output beam.

The focal lengths and mirror spacings are chosen to satisfy the 10X beam expansion. Aberrations limit the allowable focal length of spherical secondary mirror 16 to approximately 4.32 cm. The focal length of primary mirror 14, therefore, is approximately 43.2 cm., and the separation between primary mirror 14 and secondary mirror 16 is approximately 38.9 cm.

Proper homodyne operation of the detector requires that the intensity of local oscillator beam 22b be adjusted to optimize the signal-to-noise ratio. This adjustment is made in FIG. 2 by adjusting the position of roof reflector 32 along axis 30 to increase or decrease the amount of spillover.

FIG. 3 shows another embodiment of the roof reflector which allows adjustment of the local oscillator beam intensity. In this embodiment, roof reflector 40 includes a cavity 42 through which beam 22 passes. Variable attenuator 44 is positioned in cavity 42 so that the adjustment of local oscillator beam intensity is accomplished inside roof reflector 40, where local oscillator beam 22b is separated from output beam 22a and from incident radiation 28. Variable attenuator 44 is preferably two uncoated gallium arsenide plates 46 and 48 oriented at Brewster's angle with respect to the local oscillator beam 22b. In the unattenuated position, the normal of the Brewster angle plate is located in the plane of polarization of the laser light. Rotation of variable Brewster attenuator 44 about the beam axis provides variable transmission of local oscillator beam 22b.

In conclusion, the laser Doppler homodyne system of the present invention overcomes several of the shortcomings of prior art systems, and uses a minimum of optical components to achieve this desired performance. Although the present invention has been described with reference to a series of preferred embodiments, workers skilled in the art will recognize that changes in form and detail may be made without departing from the spirit and scope of the present invention.

The embodiments of the invention in which an exclusive property or right is claimed are defined as follows:

1. An optical system comprising:
   light source means for producing a light beam;
   roof reflector means having first and second reflecting surfaces, the first reflecting surface for separating the light beam into an output beam and a local oscillator beam, and the second reflecting surface for reflecting incident radiation;
   transmitter means positioned to receive the output beam from the first reflecting surface, the transmitter means for expanding the beam diameter of the output beam and transmitting the output beam;
   receiver means for receiving incident radiation and directing the incident radiation to the second reflecting surface; and
   detector means positioned to receive the local oscillator beam and to receive the incident radiation from the second reflecting surface, the detector means for producing a signal indicative of the local oscillator beam and the incident radiation.

2. The optical system of claim 1 wherein the second reflecting surface directs the incident radiation to the detector means along an essentially common path with the local oscillator beam.

3. The optical system of claim 2 wherein the roof reflector means includes an opening through which the local oscillator beam passes.

4. The optical system of claim 3 and further comprising attenuator means positioned in the opening for attenuating the local oscillator beam.

5. The optical system of claim 4 wherein the attenuator means is a Brewster attenuator.

6. The optical system of claim 1 wherein the roof reflector means is positioned to allow the local oscillator beam to pass the roof reflector means without being reflected by the first and second reflective surfaces.

7. The optical system of claim 1 wherein the transmitter means collimates the output beam after expanding the beam diameter of the output beam.

8. The optical system of claim 7 wherein the transmitter means comprises:
   third reflector means for diverging the output beam; and
   fourth reflector means for receiving the output beam from the third reflector means and for collimating the output beam.

9. The optical system of claim 8 wherein the third reflector means receives the output beam from the first reflector means.

10. The optical system of claim 9 wherein the third and fourth reflector means form a Cassegrain reflector system.

11. The optical system of claim 10 wherein the third reflector means has an essentially spherical reflecting surface.

12. The optical system of claim 8 wherein the fourth reflector means has an essentially parabolic reflecting surface.

13. The optical system of claim 1 wherein the receiver means converges the incident radiation and collimates the converged incident radiation.

14. The optical system of claim 13 wherein the receiver means comprises:
   fifth reflector means for converging the incident radiation; and
   sixth reflector means for receiving the incident radiation from the fifth reflector means and for collimating the incident radiation.

15. The optical system of claim 14 wherein the sixth reflector means directs the incident radiation to second reflecting surface.

16. The optical system of claim 15 wherein the fifth and sixth reflector means comprise a Cassegrain reflector system.

17. The optical system of claim 16 wherein the fifth reflector means has an essentially parabolic reflective surface and the sixth reflector means has an essentially spherical reflective surface.

18. The optical system of claim 14 wherein the transmitter means comprises:
   third reflector means for diverging the output beam; and
   fourth reflector means for receiving the output beam from the third reflector means and for collimating the output beam.

19. The optical system of claim 18 wherein the third reflector means receives the output beam from the first reflecting surface.

20. The optical system of claim 19 wherein the sixth reflector means directs the incident radiation to second reflecting surface.

21. The optical system of claim 20 wherein the fourth and fifth reflector means comprise portions of a first common reflector.

22. The optical system of claim 21 wherein the third and sixth reflector means comprise portions of a second common reflector.

23. The optical system of claim 22 wherein the first common reflector has an essentially parabolic reflective surface and the second common reflector has an essentially spherical reflective surface.

24. An optical system comprising:
   light source means for producing a light beam;
   roof reflector means having first and second nonparallel reflecting surfaces, the first reflecting surface for separating the light beam into first and second portions, and the second reflecting surface for reflecting incident radiation;
   beam expander means for expanding the beam diameter of the first portion;
   beam reducer means for reducing the beam diameter of incident radiation; and
   detector means for receiving the incident radiation and the second portion of the light beam and for producing a signal in response to the incident radiation and the second portion.

25. The optical system of claim 24 wherein the beam expander means comprises:
third reflector means for diverging the first portion; and
fourth reflector means for receiving the first portion from the third reflector means and for collimating the first portion.

26. The optical system of claim 25 wherein the third reflector means receives the first portion from the first reflecting surface.

27. The optical system of claim 26 wherein the beam reducer means comprises:
fifth reflector means for converging the incident radiation; and
sixth reflector means for receiving the incident radiation from the fifth reflector means and for collimating the incident radiation.

28. The optical system of claim 27 wherein the sixth reflector means directs the incident radiation to the second reflecting surface.

29. The optical system of claim 28 wherein the fourth and fifth reflector means comprise portions of a first common reflector.

30. The optical system of claim 29 wherein the third and sixth reflector means comprise portions of a second common reflector.

31. The optical system of claim 30 wherein the first common reflector has an essentially parabolic reflective surface and the second common reflector has an essentially spherical reflective surface.

32. The optical system of claim 31 wherein the roof reflector means is positioned to allow the second portion of the light beam to pass the roof reflector means without being reflected by the first and second reflective surfaces.

33. The optical system of claim 32 wherein the roof reflector means defines an opening through which the second portion passes.

34. The optical system of claim 30 wherein the first common reflector defines an aperture.

35. The optical system of claim 34 wherein the first portion is directed from the first reflective surface through the aperture to the third reflector means and wherein the incident radiation is directed from the sixth reflector means through the aperture to the second reflective surface.

36. The optical system of claim 34 wherein the roof reflector means is positioned in the aperture.

37. The optical system of claim 24 wherein the first and second reflecting surfaces are essentially perpendicular to one another.

38. In an optical system having light source means for producing a light beam and detector means for receiving a local oscillator beam and incident radiation and for producing a signal in response to the local oscillator beam and the incident radiation, a transmitter-receiver system comprising:
first reflector means for separating the light beam into an output beam and the local oscillator beam;
second reflector means for reflecting incident radiation to the detector means;
third reflector means positioned to receive the output beam, the third reflector means for diverging the output beam;
fourth reflector means positioned to receive the output beam from the third reflector means, the fourth reflector means for collimating the output beam;
fifth reflector means for converging the incident radiation; and
sixth reflector means positioned to receive the incident radiation from the fifth reflector means, the sixth reflector means for collimating the incident radiation and directing the incident radiation to the second reflector means.

* * * * *